(No Model.)
D. M. KYLE.
LAWN MOWER.
No. 458,715. Patented Sept. 1, 1891.
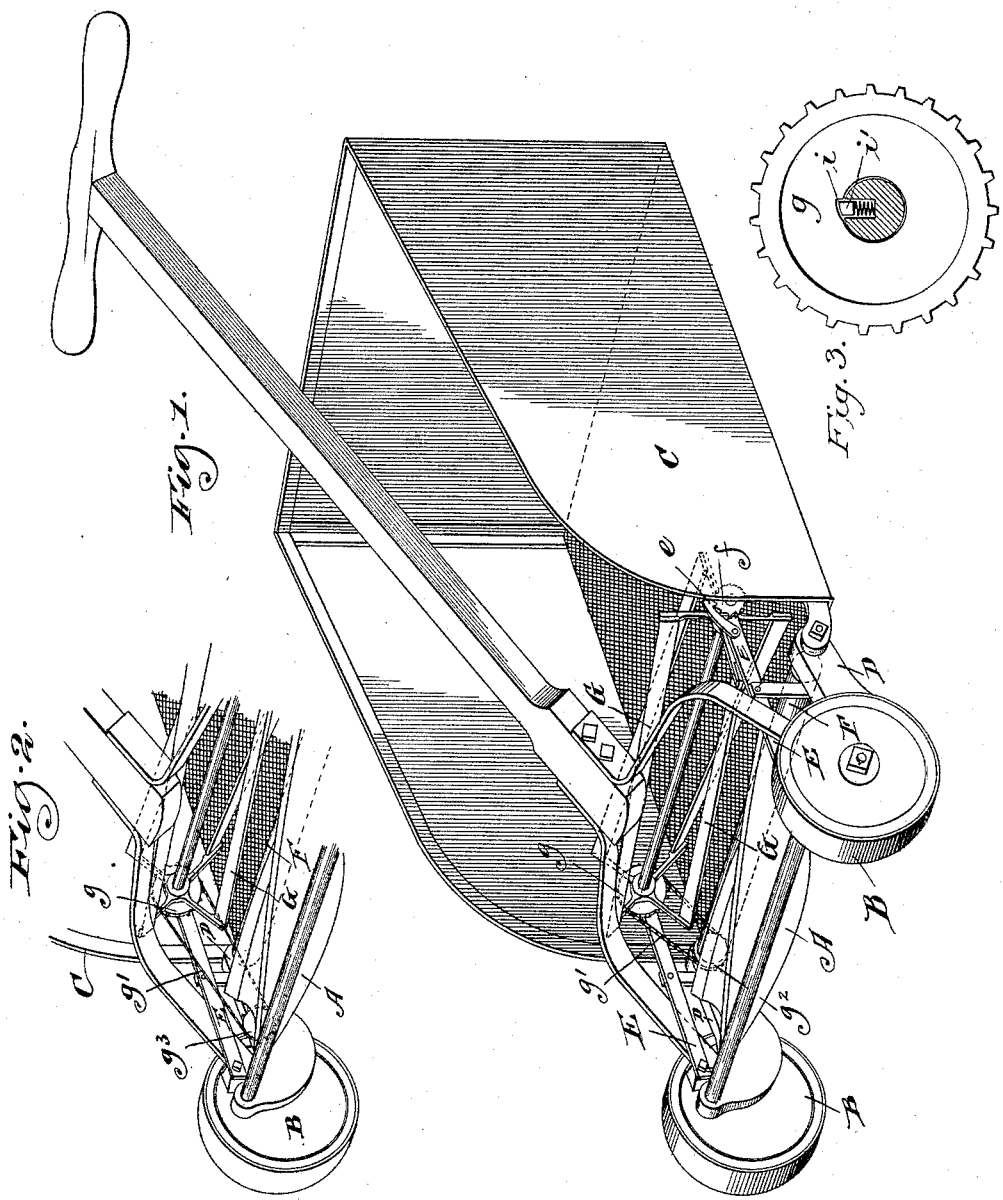
Witnesses,
D. S. Mann.
Frederick C. Goodwin.
Inventor,
David M. Kyle
By Offield & Towle
Attys.

UNITED STATES PATENT OFFICE.

DAVID M. KYLE, OF CHICAGO, ILLINOIS.

LAWN-MOWER.

SPECIFICATION forming part of Letters Patent No. 458,715, dated September 1, 1891.

Application filed October 16, 1890. Serial No. 368,316. (No model.)

*To all whom it may concern:*

Be it known that I, DAVID M. KYLE, of Chicago, Illinois, have invented certain new and useful Improvements in Lawn-Mowers, of which the following is a specification.

My invention relates to lawn-mowers having a receptacle attached thereto wherein the cut grass is deposited, and particularly relates to means whereby the cut grass is removed from the forward edge of the floor of the receptacle and caused to accumulate at the rear of the receiving-box.

In the accompanying drawings, Figure 1 is a perspective view of a lawn-mower, showing my improvements as applied thereto. Fig. 2 is a perspective view of part of a lawn-mower, showing a modified form of construction in the gearing of my improved grass-gatherer. Fig. 3 is a sectional detail of a backing-ratchet.

The cutting-knives A are operated by the wheels B in the usual manner, the cut grass being deposited upon the forward edge of the floor of a receiver or box C, said box being fastened to the usual projections D. Journaled in the brackets E and having a sprocket $g$ and chain $g'$ connecting with the sprocket $g^2$ on roller F is a reel G. A dog $e$, engaging a ratchet $f$, locks the reel when a backward movement of the lawn-mower is necessary, thus preventing dislodgment of the accumulated grass.

In Fig. 2 the chain $g'$ connects sprocket $g$ on reel G with a sprocket $g^3$ on the shaft of the cutting-knives, said connection giving the same movement to reel G as shown by the connecting parts in Fig. 1. It is also apparent that gears could be used with a like result. Referring to Fig. 3 of the drawings, sprocket $g$ has a notched seat $i$ in its hub to receive a spring-controlled key $i'$, said key being seated in the shaft of the reel G. In a backward movement of the lawn-mower the sprocket $g$ will turn freely upon its shaft, and the reel G will be held against rotation by the ratchet $f$ and dog $c$. Therefore I do not limit myself to the exact construction as shown in the drawings; but

I claim—

A lawn-mower having a receptacle for cut grass, a reel journaled in bearings, with suitable connections between said reel and a rotating part of the machine, whereby the reel is rotated to cast the grass toward the rear of the receptacle, and a locking device to secure the reel against a reverse movement, substantially as described.

DAVID M. KYLE.

Witnesses:
FREDERICK C. GOODWIN,
L. T. MANN.